Figure 1:
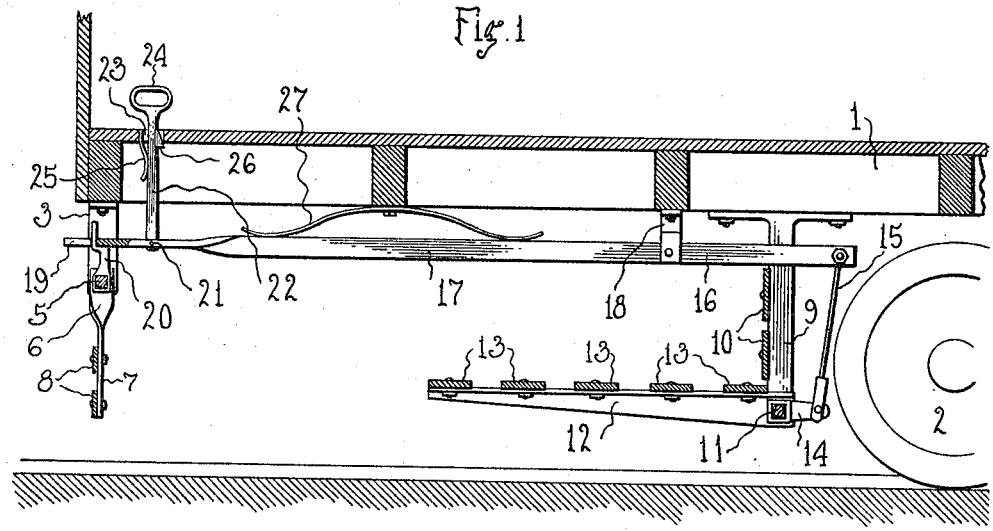

G. H. BOLDUC.
CAR WHEEL GUARD.
APPLICATION FILED OCT. 1, 1915.

1,181,635.

Patented May 2, 1916.

Witnesses
Arthur F. Draper
Chas. W. Stauffer

Inventor
George H. Bolduc
By
Attorneys

UNITED STATES PATENT OFFICE.

GEORGE H. BOLDUC, OF DETROIT, MICHIGAN.

CAR-WHEEL GUARD.

1,181,635.   Specification of Letters Patent.   Patented May 2, 1916.

Application filed October 1, 1915.   Serial No. 53,535.

*To all whom it may concern:*

Be it known that I, GEORGE H. BOLDUC, a subject of the King of England, residing at Detroit, in the county of Wayne and State of Michigan, have invented certain new and useful Improvements in Car-Wheel Guards, of which the following is a specification, reference being had therein to the accompanying drawings.

In the selection of car fenders or wheel guards, it is necessary to consider the estimated cost of maintenance, weight of the device, number of parts and material used in construction, for, if the maintenance is too high, a railroad company will neglect to maintain the fenders in an efficient condition; and the fenders should be as light as possible without sacrificing durability, so as to reduce the dead weight which a car must carry. Then again, the material should be of such kind as will withstand the service for which it is intended. One of the most important factors is that the fender should have as few parts as possible, be simple of construction, easy of inspection and economical of maintenance.

A wheel guard fender of the automatic gravity drop type possessing the above characteristics will be hereinafter specifically described and then claimed, and reference will now be had to the drawing wherein—

Figure 2:
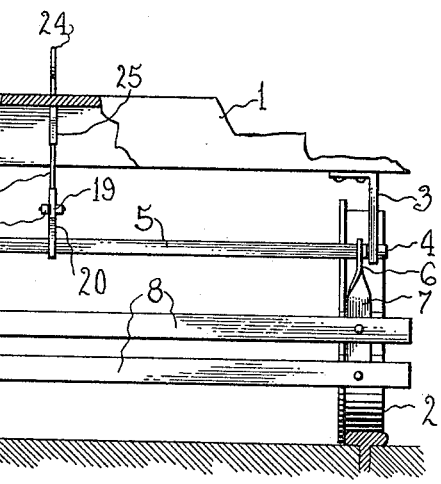

Figure 1 is a longitudinal sectional view of a portion of a car body provided with an automatic gravity drop wheel guard in accordance with my invention, and Fig. 2 is a front elevation of the same.

In the drawing, 1 denotes a portion of a car frame and 2 a truck of the car. An end of the car frame 1 is provided with depending bearings 3 for the pintles 4 of a gate shaft 5, such shaft being rectangular in cross section. Mounted on the shaft 5, contiguous to the depending bearings 3, are the twisted ends 6 of depending gate bars 7 connected by parallel slats 8; the elements 5 to 8 inclusive constituting a pivoted gate suspended beneath the platform of the car and in proximity to the rails upon which the car travels.

The car frame 1 is provided with hangers 9 adjacent the truck 2 and said hangers are connected by transverse slats 10. Pivoted in the lower ends of the hangers 9 are the pintles of a shaft 11. Mounted on the shaft is a gravity drop wheel guard, comprising angle arms 12 connected by parallel slats 13. The lower edges of the angle arms 12 taper inwardly toward the outer edge of the wheel guard, whereby the outer edge of the wheel guard may assume a position on or continguous to the ground. The shaft 11, intermediate the ends thereof, is provided with a crank 14, and pivotally connected to said crank is a connecting rod or link 15, which has the upper end thereof pivotally connected to the short arm 16 of a fulcrumed lever 17, said lever being pivotally connected to a depending bracket or hanger 18, carried by the car frame 1. The fulcrumed lever 17 extends between the bearings 3, over the gate shaft 5 and has the end thereof slotted or bifurcated, as at 19, to receive an angle trip 20 mounted upon the gate shaft 5, intermediate the ends thereof as best shown in Fig. 2.

Pivotally connected to the fulcrum lever 17 is a replacing member 22, extending upwardly through an opening 23 in the far platform and terminating in a handle or hand grip 24 which permits of the replacing member being easily gripped and raised to restore the fulcrumed lever to normal position. The replacing member 22 is frictionally engaged by a flat spring 25 adjacent the car platform, and said replacing member has a lug 26 which can be placed in engagement with the car platform to hold the replacing member in an elevated position, free of the angle trip 20, and with the wheel guard in a raised position.

Connected to the car body and bearing upon the fulcrumed lever 17 are the ends of a spring 27 which insures a quick action of the guard when released by the angle trip 20.

A good fender or wheel guard must be highly efficient in life saving qualities, that is, the picking up or removal of a body from the path of a car. With this thought in view I use the automatic trip type and arrange the gate whereby a body run down by a car will impinge the gate and release the fulcrumed lever 15, thereby allowing the wheel guard to drop by gravity and pick up the body or prevent it from contacting with the truck of a car. The replacing member 22 not only restores the wheel guard to normal position, after having been used, but permits of the wheel guard being manually raised whereby the gate is free to swing and clear an obstacle.

With the fulcrumed lever set on the trip 20, the spring 25 in engagement with the replacing member 22, and said member engaging the car platform, it is impossible for vibration of the car, when in operation, to dislodge the forward end of the fulcrumed lever, relative to the trip, and should the gate accidentally swing and release the wheel guard, said guard can be easily and quickly restored to normal position.

I attach considerable importance to the fact that the fender or wheel guard can be used in connection with all types of street railway cars and being located beneath the car body, it is not susceptible to injury by vehicular traffic and does not interfere with the coupling of one car to another.

One embodiment of my invention has been illustrated, but it is to be understood that the structural elements are susceptible to such variations and modifications as fall within the scope of the appended claim.

What I claim is:—

The combination with a car body having a platform and a truck, of a pivoted gate below the platform of said car body, a trip carried thereby, a fulcrumed lever below said car body normally engaged by said trip, a pivoted wheel guard in front of said truck and held normally elevated by said fulcrumed lever and adapted to be released when said trip is moved out of engagement with said lever, a replacing member connected to said fulcrumed member and extending above the platform of said car, and means carried by said replacing member and adapted to engage the platform of said car body to hold said member in an elevated position.

In testimony whereof I affix my signature in presence of two witnesses.

GEORGE H. BOLDUC.

Witnesses:
KARL H. BUTLER,
ANNA M. DORR.

Copies of this patent may be obtained for five cents each, by addressing the "Commissioner of Patents, Washington, D. C."